Jan. 3, 1939.   J. H. YOUNG ET AL   2,142,164
FIREPROOFING MEMBER
Filed Feb. 27, 1936

Inventors.
James Howard Young
Paul W. Jenkins
by Jas. H. Churchill
Atty.

Patented Jan. 3, 1939

2,142,164

UNITED STATES PATENT OFFICE 2,142,164

FIREPROOFING MEMBER

James Howard Young and Paul W. Jenkins, Pittsburgh, Pa., assignors to H. H. Robertson Company, Pittsburgh, Pa., a corporation of Pennsylvania Application February 27, 1936, Serial No. 66,032

4 Claims. (Cl. 72—70)

This invention has for its object to provide a fire-proofing member which is initially inactive, inexpensive and capable of being assembled in a relatively thin layer or body which can be easily handled and remains in such condition in the absence of a fire, and which is expanded under the influence of a fire and in its expanded condition forms an efficient protective or fire-proofing body or layer of materially greater thickness.

To this end, vermiculite or like micaceous material in its natural or unexfoliated condition may be employed alone or may be mixed with a binder of gypsum or other material of such character as will not detrimentally interfere with the expansion or exfoliation of the vermiculite under the influence of a fire.

The fire-proofing member composed of vermiculite in its natural or unexpanded condition can be quickly and easily placed in position with relation to a steel or other structural member of a building or other structure and may be retained in such position by any suitable means. In case a fire occurs in the building or other structure, the initial heat from the fire acts on the inactive fire-proofing member and causes the crude or natural vermiculite to expand and the water therein to be driven off and the crude vermiculite to be converted into an active or expanded condition and form a layer or body of materially greater volume or thickness which is materially lighter per unit volume and capable of resisting excessive temperature due to the fire, and to offer efficient resistance to heat transmission, and thereby provide the steel or other structural member with a fire-resisting member capable of affording efficient protection against fire.

The normally inactive fire-proofing member of vermiculite in its crude or natural condition, may be used to protect metal floors, girders, beams, or other structural members of a building whether of steel, wood, concrete or of other material.

The particular features of this invention will be hereinafter pointed out in the claims at the end of this specification.

Figure 1:
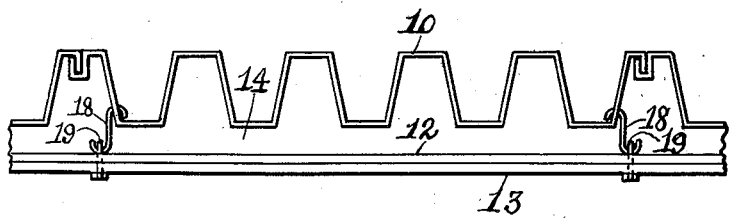
Figure 2:
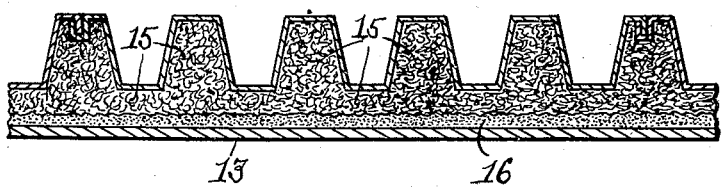

In the accompanying drawing, Fig. 1 conventionally represents a portion of a steel floor of a building or other structure and a fire-resisting member embodying this invention in its inactive state and supported below and separated from the steel floor, and Fig. 2 is a similar view of the steel floor with the fire-resisting member in its expanded and active condition and converted into a fire-proofing member affording efficient protection against fire for the steel floor.

Referring to the drawing 10 represents a steel or other structural member which is to be protected against fire exposure, and 12 represents a compact or relatively thin layer or body of material composed in whole or in part of mineral vermiculite in its natural or crude condition, in which the vermiculite is unexfoliated or unexpanded and therefore inactive in the absence of a fire.

The inactive layer or body 12 may be supported in any suitable manner so as to be disposed between the structural member to be protected and the possible source of fire, and in the present instance, the layer or body 12 rests upon a supporting or retaining member 13 suspended from the floor 10, and located so that the body or layer 12 is separated from the floor by a substantial space 14, which allows for expansion of the crude or natural vermiculite of the layer or body 12 under the conditions of a fire.

In case of a fire, the heat thereof initially expands the crude or natural vermiculite and also dehydrates the same, and the expansion is such that the crude or natural vermiculite is converted into a layer or body 15 which is of a volume or thickness materially greater than that of the inactive body or layer 12 and is also materially lighter per unit volume than the body or layer 12 and fills the space 14 and forms a protective layer or body of high heat insulating efficiency, which protects the floor against excessive temperature rise and provides efficient protection for the structural member against the fire.

The crude or natural vermiculite may be used alone in a loose condition or it may be mixed with a binder, preferably gypsum or other material which affords more or less resistance to a fire and is of such character as will not materially interfere with the expansion of the vermiculite in its crude or natural condition. The mixture of crude or natural vermiculite and gypsum or other binder may be made in the form of a slab, layer or body, which is compact, relatively thin and such as can easily be handled and readily placed in position and supported in operative position with relation to the structural member.

In practice, upon expansion of the crude or natural vermiculite, the binder is readily disintegrated and does not prevent expansion of the vermiculite.

In Fig. 1 the retaining or supporting member 13 is represented as suspended from the steel floor 10 by hooks 18 and wires 19. The supporting member 13 may be thin metal sheets, wire mesh or any other suitable material.

What is claimed is:

1. In a building or other structure, in combination, a structural member capable of being impaired by excessive temperatures of a fire, a fire resistive member co-operating with said structural member and capable of expanding when subjected to the initial heat of a fire to form a protective member of greater thickness capable of acting in its expanded condition as an efficient heat insulator to thereby effectively protect the structural member from excessive temperatures due to the fire and means for operatively supporting the fire resistive member in operative relation to the structural member.

2. In a building or other structure, in combination, a structural member, a retaining member opposed to said structural member and spaced therefrom, and a protective member for said structural member located in said space and capable of being expanded by the initial heat of a fire to fill said space and form a heat insulating member for effectively protecting the structural member from excessive temperatures due to the fire.

3. In a building or other structure, in combination, a structural member, a retaining member opposed to said structural member and separated therefrom by a space of substantial depth, and a protective member for said structural member located in said space and normally of a thickness less than the depth of said space and capable of expanding when heated to fill the said space with a material having a relatively high heat insulating efficiency.

4. In a building or other structure, in combination, a metallic floor, a retaining member suspended from said floor and separated therefrom by a space of substantial depth, and a substantially thin layer of unexfoliated material supported by said retaining member and capable of being expanded by the initial heat of a fire to form a fire protecting member of materially greater thickness and having a relatively high heat insulating efficiency.

JAMES HOWARD YOUNG.
PAUL W. JENKINS.